United States Patent [19]

Otsuka et al.

[11] Patent Number: 5,428,137

[45] Date of Patent: Jun. 27, 1995

[54] MONOAZO LIQUID DYE AND SOLUTIONS THEREOF

[75] Inventors: Masahiro Otsuka, Osaka; Toru Tsuruhara, Kadoma, both of Japan

[73] Assignee: Orient Chemical Industries, Ltd., Osaka, Japan

[21] Appl. No.: 10,659

[22] Filed: Jan. 28, 1993

[30] Foreign Application Priority Data

Jan. 31, 1992 [JP] Japan .................................. 4-046248
Feb. 14, 1992 [JP] Japan .................................. 4-061444

[51] Int. Cl.$^6$ .................... C09B 29/085; C09B 29/15; C09B 29/46
[52] U.S. Cl. .................... 534/792; 534/839; 534/856; 534/857; 534/863; 8/521; 8/938; 44/328; 208/12; 208/15; 208/16
[58] Field of Search ............... 534/792, 839, 856, 857, 534/863; 8/521, 938; 208/12, 15, 16; 44/328

[56] References Cited

U.S. PATENT DOCUMENTS

| | | | |
|---|---|---|---|
| 211,671 | 1/1879 | Roussin et al. | 534/839 X |
| 2,068,081 | 1/1937 | Sharma | 534/839 X |
| 2,126,841 | 8/1938 | Thurm | 534/856 X |
| 2,224,904 | 12/1940 | Elley et al. | 534/839 X |
| 4,588,517 | 5/1986 | Kaneko et al. | 534/577 X |

FOREIGN PATENT DOCUMENTS

| | | | |
|---|---|---|---|
| 107492 | 5/1984 | European Pat. Off. | |
| 134446 | 3/1985 | European Pat. Off. | |
| 155470 | 9/1985 | European Pat. Off. | |
| 2305475 | 10/1976 | France | |
| 2157609 | 5/1973 | Germany | 534/839 |
| 50-12386 | 2/1975 | Japan | 534/792 |
| 1142239 | 2/1969 | United Kingdom | |

OTHER PUBLICATIONS

Brown et al, Chemical Abstracts, vol. 56, No. 5286h (1962).
Ukawa et al. Chemical Abstracts vol. 85, No. 14, Abstract No. 95964j Oct. 4, 1976, p. 95.
Abe et al. Chemical Abstracts vol. 83, No. 2, Abstract No. 12072b Jul. 14, 1975.
Meybeck et al. Teintex vol. 41, No. 1, Jan. 1976.

Primary Examiner—Mary C. Lee
Assistant Examiner—Fiona T. Powers
Attorney, Agent, or Firm—McGlew and Tuttle

[57] ABSTRACT

The monoazo compound represented by formula I is excellent in compatibility with, solubility in, and coloring power for, almost all water-immiscible organic liquids, has a low melting point, and is suitable for use to color molten plastics, synthetic fiber spinning solutions, etc., and to color thermal transfer ink.

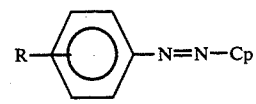

[I]

wherein R represents sec-butyl; Cp represents a coupling component residue.

The dense solution of at least one kind of said monoazo compound in a hydrocarbon solvent diffuses and dissolves quickly and uniformly in coloring subjects such as petroleum products, and is capable of coloring fuel oil etc. to a desired distinguishable color density with small amounts.

11 Claims, No Drawings

MONOAZO LIQUID DYE AND SOLUTIONS THEREOF

BACKGROUND OF THE INVENTION

1. Field of the Invention

The present invention relates to a monoazo compound used to color petroleum products and hydrocarbon solvents and for other purposes, and a dense solution of said monoazo compound in a hydrocarbon solvent.

2. Description of the Prior Art

As coloring agents for synthetic resins, lacquers, natural and synthetic waxes, solid paraffins, etc., various monoazo oil-soluble dyes listed in the Color Index (e.g., C.I. Solvent Colors: YELLOW 2, 7, 9, 10, 11, 12, 14, 16, 18, 56, 58; ORANGE 2, 7; RED 2, 24) are known.

Industrial organic solvents and petroleum products such as gasoline, lamp oil and light oil are colored for the purpose of their identification. For example, fuel oil is colored with an oil-soluble dye with improved solubility in hydrocarbon organic solvents. In this case, the oil-soluble dye is usually used as a solution of the maximum possible concentration in the hydrocarbon organic solvent.

Proposals concerning oil-soluble azo dyes for these uses are disclosed in the specification for British Patent No. 1142239, Japanese Patent Examined Publication Nos. 17390/1981 and 36940/1982 and Japanese Patent Publication Open to Public Inspection (hereinafter referred to as Japanese Patent O.P.I. Publication) Nos. 2525/1971, 94029/1975, 99959/1980 and 187456/1983.

For example, the specification for British Patent No. 1142239 describes a monoazo dye synthesized from m-toluidine and N,N-diethylaniline or N,N-dipropylaniline, and a dense solution thereof used to color petroleum and for other purposes.

Also, Japanese Patent O.P.I. Publication No. 2525/1971 describes that the dense solution prepared by dissolving a monoazo dye represented by the following formula:

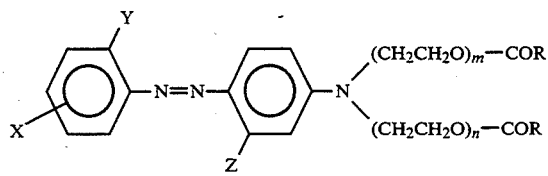

in an aromatic hydrocarbon solvent such as xylene is capable of imparting a bluish red color on petroleum products.

Japanese Patent O.P.I. Publication No. 99959/1980 discloses a monoazo dye capable of forming a salt with aliphatic amine obtained by reaction of an aniline substituted by a long-chain alkyl having 8 to 18 carbon atoms and a pyrazolone derivative having a carboxyl group or β-naphthol.

Japanese Patent O.P.I. Publication No. 94029/1975 discloses a monoazo dye obtained by reaction with, for example, a alkylamino-substituted β-naphthol derivative having 4 to 21 carbon atoms as a coupling component, stating that this red dye dissolves well or limitlessly in aromatic and aliphatic substances, and that it can be used to color automobile fuels, varnish, wax and fat.

The above-mentioned oil-soluble dyes listed in the Color Index have any one or more of the following drawbacks:

1) Solubility in hydrocarbon solvents, particularly paraffin solvents, is low. The saturation concentration of this kind of conventional oil-soluble dyes in paraffin solvents at normal temperature does not exceed 15% by weight. For example, the saturation concentration in hexane at normal temperature is not higher than 5% by weight.

2) Coloring power for petroleum products such as fuel oil is weak. Colored fuel oil should make it possible to distinguish between petroleum products to be taxed by coloring with coloring agents of concentrations of the order of some dozens of ppm.

3) Because of high crystallinity and high intermolecular aggregating force, the oil-soluble dye is easy to extract from the colored system. A countermeasure is therefore necessary against tax evasion by discoloring the petroleum products to be taxed.

4) In the case of dyes of long-chain alkyl-substituted structure, the high molecular weight lowers the coloring density per unit part by weight.

Also, the dye described in Japanese Patent O.P.I. Publication No. 99959/1980 poses a problem in coloring power, whose solubility in ligroine or kerosine is 0.5 to 1.5 g/10 cc.

The object of the present invention is to provide a monoazo compound which is excellent in compatibility with, solubility in and coloring power for almost all water-immiscible organic liquids, such as various hydrocarbon solvents, petroleum solvents, fuel oils, lubricating oils, plastics and hydrophobic synthetic fibers, and which is suitable for use to color molten plastics and dope dyeings and to color thermal transfer ink because of the low melting point, and a dense solution thereof which is free of the problems of powder formation and dust scattering because of the liquid form, which can easily be prepared by simple dissolution operation, which quickly and uniformly diffuses and dissolves in coloring subjects such as petroleum products, and which is capable of coloring fuel oil etc. to a desired distinguishable color density in small amounts.

SUMMARY OF THE INVENTION

The present inventors found that the above object is accomplished by a particular monoazo compound, and developed the present invention.

Accordingly, the monoazo compound of the present invention is represented by the following formula I:

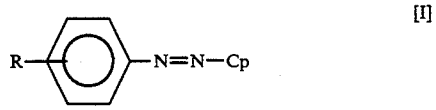

wherein R represents sec-butyl; Cp represents a coupling component residue selected from the group consisting of the coupling component residues represented by the following formulas (a), (b), (c) and (d).

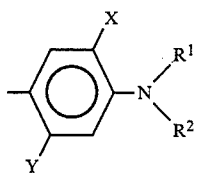

(a)

wherein $R^1$ and $R^2$ independently represent a linear or branched alkyl-group, a hydroxyalkyl group or β-alkoxyethyl group; X and Y independently represent hydrogen, an alkyl group having 1 or 2 carbon atoms or an alkoxy group having 1 or 2 carbon atoms, with the exception of compounds wherein X and Y are both hydrogen.

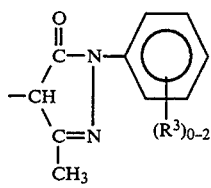

(b)

wherein $(R^3)_{0-2}$ means zero to two substituents $R^3$, each $R^3$ independently representing an alkyl group having 1 or 2 carbon atoms, an alkoxy group having 1 or 2 carbon atoms or a halogen.

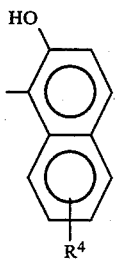

(c)

wherein $R^4$ represents hydrogen, an alkyl group having 1 to 4 carbon atoms, an alkoxy group having 1 or 2 carbon atoms or a halogen.

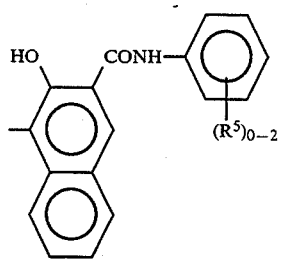

(d)

wherein $(R^5)_{0-2}$ means zero to two substituents $R^5$, each $R^5$ independently representing an alkyl group having 1 or 2 carbon atoms, an alkoxy group having 1 or 2 carbon atoms, nitro group or a halogen.

The monoazo compound of the present invention is excellent in compatibility with, solubility in, and coloring power for almost all water-immiscible organic liquids, such as various hydrocarbon solvents, petroleum solvents, fuel oils, lubricating oils and plastics and hydrophobic synthetic fibers. In comparison with dyes having a long-chain alkyl group or the like introduced to the molecule thereof in order to make them more hydrophobic, the monoazo compound of the present invention offers equivalent coloring densities in smaller amounts of addition because it has a lower molecular weight, as is evident in terms of molecular extinction coefficients ε.

Also, the monoazo compound of the present invention is a viscous liquid at normal temperature or has a low melting point even if it is a solid at normal temperature; in any case, the monoazo compound of the present invention is characterized by a low melting point. The monoazo compound of the present invention is therefore suitable for use to quickly and uniformly color molten plastics, synthetic fiber spinning solutions, etc., and for use to color thermal transfer ink.

For example, when dissolved in a petroleum product, the monoazo compound of the present invention distinctly colors the petroleum product to the extent that the color is recognizable even at a concentration of about 10 ppm, (0.001%) and the petroleum product thus colored is not easily discolored even by a discoloring agent. Since the monoazo compound of the present invention is thus effective in small amounts of use, exhaust gas emitted due to combustion of the petroleum product, if diffused in the atmosphere, can be more efficiently prevented from adversely affecting the environment.

Also, in comparison with dyes having a long-chain alkyl-substituted aniline such as dodecylaniline as the diazo component, the monoazo compound of the present invention offers much higher coloring densities when compared at the same amount of addition.

Also, the monoazo compound of the present invention has a solubility about 3 to 10 times that of the dyes having aniline, toluidine or xylidine as the diazo component, and its melting point is lower by about 100°. In comparison with the monoazo dyes having an aniline substituted by a linear alkyl of carbon number 3 or 4, such as n-butylaniline, as the diazo component, the monoazo compound of the present invention has an over 2 times higher solubility and a melting point lower by over 40°.

Next, the dense solution of the present invention is a solution of at least one kind of the monoazo compound represented by the above formula I in a hydrocarbon solvent, wherein the concentration of the monoazo compound is 20 to 80% by weight.

The dense solution of the present invention is free of problems of powder formation and dust scattering because of the liquid form, can easily be prepared by simple dissolution operation, which quickly and uniformly diffuses and dissolves in coloring subjects such as isooctane, gasoline, diesel oil and other petroleum products, and is capable of coloring fuel oil etc. to a desired distinguishable color density in small amounts.

DETAILED DESCRIPTION OF THE INVENTION

The monoazo compound (hereinafter also referred to as monoazo dye) of the present invention is characterized by the containment of a particular diazo component therein. The coupler is selected from the group comprising well-known dye intermediates having no sulfonate group or carboxylate group.

The monoazo compound of the present invention, represented by the above formula I, can be prepared by reacting sec-butylaniline, diazotized by a conventional method, with a coupler for forming the coupling component residue Cp selected from the group consisting of the coupling component residues represented by the formulas (a), (b), (c) and (d) (hereinafter also referred to as (H)Cp). The kind and position of the substituent in the coupling component (H)Cp and the presence or absence of the substituent has substantially no influence on the effect of the present invention.

The diazo component sec-butylaniline may be of any one with respect to the position of the substituent sec-butyl group, whether "ortho", "meta" or "para". This is because the position of the substituent sec-butyl group has substantially no influence on the solubility of the monoazo compound of the present invention in organic solvents, tone or any other property. For this reason, when using this monoazo compound for various coloring purposes, the monoazo compound of the present invention may be a mixture of such compounds of different positions of the substituent sec-butyl group. The sec-butylaniline used to produce the monoazo compound may therefore be a mixture of o-butylaniline, m-butylaniline and p-butylaniline, like ordinary commercial products.

Examples of the coupling component (H)Cp corresponding to formula (a) include
N,N-dialkylaniline derivatives, such as
N,N-diethyl-m-toluidine,
N,N-dimethoxyethylaniline and
N,N-diethylanisidine;
N,N-bis($\beta$-oxyethyl)aniline; and
N-($\beta$-oxyethyl)-N-ethyltoluidine.

Examples of the coupling component (H)Cp corresponding to formula (b) include
pyrazolone derivatives such as
1-phenyl-3-methyl-5-pyrazolone,
1-(4-methylphenyl)-3-methyl-5-pyrazolone and
1-(2-chlorophenyl)-3-methyl-5-pyrazolone.

Examples of the coupling component (H)Cp corresponding to formula (c) include
$\beta$-naphthol,
methyl-substituted $\beta$-naphthol and
ethyl-substituted $\beta$-naphthol.

Examples of the coupling component (H)Cp corresponding to formula (d) include
naphthol AS,
naphthol AS-D,
naphthol AS-OL,
naphthol AS-E and
naphthol AS-TR.

Examples of the monoazo compound of the present invention are given in Table 1, with their melting points (mp) (those having no melting point or solidifying point in the temperature range from $-20°$ C. to $20°$ C. are described as "liquid dyes"), maximum visible absorption wavelengths corresponding to the hue ($\lambda$max) (chloroform used as solvent) and molecular extinction coefficients ($\epsilon$).

TABLE 1

| A | Structural formula | $\lambda$ max (nm) | $\epsilon$ | B |
|---|---|---|---|---|
| 1 | sec-$C_4H_9$—⟨⟩—N=N—⟨⟩($CH_3$)—N($C_2H_5$)($C_2H_5$) | 410 | 25200 | Liquid dye |
| 2 | sec-$C_4H_9$—⟨⟩—N=N—⟨⟩($CH_3$)—N($C_2H_5$)($C_2H_4OH$) | 404 | 25300 | Liquid dye |
| 3 | sec-$C_4H_9$—⟨⟩—N=N—CH(C(=O)—N—⟨⟩)(C(=N)—$CH_3$) | 404 | 25500 | Liquid dye |
| 4 | sec-$C_4H_9$—⟨⟩—N=N—naphthol(OH) | 490 | 16600 | Liquid dye |

TABLE 1-continued

| A | Structural formula | λ max (nm) | ε | B |
|---|---|---|---|---|
| 5 | sec-C₄H₉—⟨phenyl⟩—N=N—⟨naphthyl with OH and CONH—phenyl⟩ | 536 | 26700 | 118 to 120 |

A: Example Compound No.
B: Physical property or melting point (°C.)

The monoazo compound of the present invention wherein the coupling component residue Cp corresponds to formula (a), (b) or (c) occurs as a yellow or orange liquid (liquid dye) having a high or low viscosity at normal temperature, exhibiting an excellent coloring effect for petroleum products and smoking oil. When these monoazo compounds are used to color smoking oil, the colored smoking oil is excellently stable in long-term storage, the smoking oil can generate colored smoke at much lower temperatures, and the oil can produce distinctly and densely colored smoke in smaller amounts of monoazo compounds use than conventionally colored smoking oil.

The monoazo compound of the present invention wherein the coupling component residue Cp corresponds to formula (d), i.e., the coupling component residue Cp is a residue of naphthol AS, a known pigment coupler, has a red color and a melting point which is lower by about 40° to 100° C. than the melting points of C.I. Pigment Red 21 and 22, and the monoazo compound wherein the diazo component is aniline, n-butylaniline or t-butylaniline, and which is similar to the melting point of the monoazo compound having a long-chain alkyl-substituted aniline as the diazo component. Its compatibility with, and solubility in, plastics, hydrocarbon solvents, etc. are markedly higher than those of conventional compounds.

The monoazo compound concentration in the dense solution of the present invention is normally 20 to 80% by weight, preferably 25 to 50% by weight.

Examples of the hydrocarbon solvent in this dense solution include
aliphatic hydrocarbons such as
n-hexane,
n-heptane,
n-octane,
n-nonane,
n-decane and
light oil;
alicyclic hydrocarbons such as
cyclohexane,
ethylcyclohexane,
cycloheptane and
cyclooctane; and
aromatic hydrocarbons such as
toluene,
xylene and
alkylnaphthalene.

These hydrocarbon solvents may be used single or in combination of two or more kinds mixed as appropriate.

The dense solution of the present invention is particularly useful in coloring petroleum products.

Although the dye in a liquid form may be added directly to the coloring subject without being diluted with the above solvent, it is preferable to properly dilute it to yield the dense solution of the present invention to provide sufficient fluidity to facilitate its use.

The dense solution of the present invention is capable of very readily and uniformly diffusing and dissolving in coloring subjects such as gasoline, kerosene, naphtha, diesel fuel, jet fuel and lubricating oil and coloring fuel oils such as gasoline to a desired distinguishable color density. In the case of a dense solution of 30% concentration, an amount of about 0.1 g per 1000 cc of the petroleum product is sufficient to obtain the desired effect.

The present invention is hereinafter described in more detail by means of the following examples. In the description given below, "part(s) by weight" is abbreviated "part(s)".

EXAMPLES

Examples of synthesis of the compound of the present invention

Example 1

Synthesis of Example Compound 1

To a mixture of 300 parts of water and 75 parts of p-(sec-butyl)aniline, 130 parts of 36% hydrochloric acid was added drop by drop while stirring the mixture, followed by cooling to under 0° C. Next, to this mixture, 88 parts of a 36% aqueous solution of sodium nitrite was added gradually drop by drop, followed by stirring at a temperature of under 0° C. for 1 hour, after which the mixture was filtered to yield a diazo solution.

Separately, to 78 parts of N,N-diethyl-m-toluidine, 200 parts of methanol and 33 parts of acetic acid were added, and the N,N-diethylaniline was dissolved. To this solution, 5 parts of sulfamic acid was added, followed by cooling to under 10° C., after which the above diazo solution was added gradually and sodium acetate was added to obtain a pH of 3 to 4, followed by stirring at under 10° C. for 20 hours.

Then, 200 parts of toluene was added to this reaction mixture. The dye thus precipitated was extracted and washed with a dilute aqueous solution of sodium hydroxide and then washed with water, after which the toluene was recovered, to yield 147 parts of a liquid dye (Example Compound 1).

The obtained dye was purified using a molecular distiller (model 2-03 thin-film distiller, produced by Shinko-Pfaudler Co., Ltd.). The purified product remained unsolidified (uncrystallized) even after 1 month of storage at −20° C. The structural formula, maximum visible absorption wavelength and molecular extinction coefficient of the purified product are shown in Table 1.

Example 2

Synthesis of Example Compound 2

A liquid dye (Example Compound 2) was obtained in the same manner as in Example 1 except that N,N-diethyl-m-toluidine was replaced with N-ethyl-N-(β-oxyethyl)toluidine.

The structural formula, maximum visible absorption wavelength and molecular extinction coefficient of the dye are shown in Table 1.

Example 3

Synthesis of Example Compound 3

To a mixture of 75 parts of water and 14.9 parts of p-(sec-butyl)aniline, 30 parts of 36% hydrochloric acid was added drop by drop while stirring the mixture, followed by cooling to under 0° C. Next, to this mixture, 19.5 parts of a 36% aqueous solution of sodium nitrite was added gradually drop by drop, followed by stirring at under 0° C. for 1 hour, after which the excess sodium nitrite was decomposed with sulfamic acid to yield a diazo solution.

Separately, to 18 parts of 1-phenyl-3-methyl-5-pyrazolone, 150 parts of water, 12 parts of a 48% aqueous solution of sodium hydroxide and 15 parts of sodium acetate were added, and the 1-phenyl-3-methyl-5-pyrazolone was dissolved, followed by cooling to under 10° C. To this solution, 100 parts of toluene was added, after which the above diazo solution was added gradually, followed by stirring at under 10° C. for 4 hours.

The toluene solution was pipetted and washed with water, after which the toluene was recovered, to yield 32 parts of a liquid dye (Example Compound 3).

The structural formula, maximum visible absorption wavelength and molecular extinction coefficient of the obtained dye are shown in Table 1.

Example 4

Synthesis of Example Compound 4

A liquid dye (Example Compound 4) was obtained in the same manner as in Example 3 except that 1-phenyl-3-methyl-5-pyrazolone was replaced with β-naphthol.

The structural formula, maximum visible absorption wavelength and molecular extinction coefficient of the dye are shown in Table 1.

Example 5

Synthesis of Example Compound 5 p-(sec-butyl)aniline was treated in the same manner as in Example 3 to yield a diazo solution.

Separately, 26 parts of naphthol AS was added to, and dissolved in, a mixture of 400 parts of water and 15 parts of a 48% aqueous solution of sodium hydroxide, followed by cooling to under 10° C. To this solution, 2 parts of a nonionic dispersing agent was added and then the above diazo solution was added, followed by stirring at under 10° C. for 6 hours.

After stirring, the precipitate was collected by filtration, washed with water and dried to yield 40.5 parts of a low boiling red dye (Example Compound 5). The structural formula, maximum visible absorption wavelength, molecular extinction coefficient and melting point of this dye as recrystallized with methyl ethyl ketone are shown in Table 1.

Example of synthesis of comparative compounds

Comparative compounds (monoazo compounds) (a) through (p) represented by a combination of a diazo component and a coupling component shown in Table 2 below were obtained in the same manner as in Examples 1, 3, 4 and 5 except that the diazo component p-(sec-butyl)aniline was replaced with aniline, 2,4-xylidine, p-(n-butyl)aniline, p-(t-butyl)aniline or p-(n-dodecyl)aniline.

In Table 2, the upper column shows melting points (°C.), the middle column shows maximum visible absorption wavelengths (nm) corresponding to hues (chloroform used as solvent), and the lower column shows molecular extinction coefficients. With respect to Comparative Compound (a), for instance, the melting point is 95° C., the maximum visible absorption wavelength is 420 nm and the molecular extinction coefficient is 28700. For melting points of compounds which can be purified with methyl ethyl ketone or n-heptane, determinations were made on those purified by the recrystallization method. Data on melting points of the other comparative compounds are not corrected.

TABLE 2

| Diazo component | Coupling component | | | |
|---|---|---|---|---|
| | ⟨N(C₂H₅)₂⟩ phenyl-N(C₂H₅)₂ | 1-phenyl-3-methyl-5-pyrazolone | β-naphthol (OH on naphthalene) | naphthol AS (OH, CONH-phenyl on naphthalene) |
| ⟨⟩-NH₂ (aniline) | a: 95 / 420 / 28700 | c: 153 / 394 / 20300 | h: 131 / 484 / 16700 | l: 240 / 524 / 24700 |

TABLE 2-continued

| Diazo component | Coupling component | | | |
|---|---|---|---|---|
| | -C<sub>6</sub>H<sub>5</sub>-N(C<sub>2</sub>H<sub>5</sub>)<sub>2</sub> | pyrazolone (H₂C-C(=O)-N(Ph)-N=C-CH₃) | OH-naphthyl | OH,CONH-Ph naphthyl |
| 2,4-dimethyl aniline (H₃C-, CH₃-, NH₂) | | d: 165 / 414 / 24400 | i: 158 / 498 / 18200 | m: 214 / 514 / 26300 |
| n-C₄H₉-phenyl-NH₂ | b: 61 / 418 / 29300 | e: 113 / 406 / 25800 | j: 76 / 492 / 16400 | n: 159 / 534 / 26500 |
| t-C₄H₉-phenyl-NH₂ | | f: 139 / 404 / 24900 | | o: 196 / 534 / 26300 |
| n-C₁₂H₂₅-phenyl-NH₂ | | g: 74 / 406 / 25700 | k: 82 / 492 / 15300 | p: 129 / 536 / 26600 |

Examples of preparation of dense solution for coloring petroleum

Example 6

To 60 parts of a paraffin hydrocarbon (n-hexane), 40 parts of each of the monoazo compounds of the present invention obtained in Examples 1 through 4 was added, followed by uniform mixing and dissolution at room temperature, to yield 40% dense solutions of respective monoazo compounds.

Using a constant temperature chamber (trade name INCUBATOR, produced by Sanyo Electric Co., Ltd.), these dense solutions were tested for storage stability. A three-month test was conducted in which heating and cooling were repeated over the temperature range from −10° C. to 25° C. at a constant rate whose half cycle is 60 minutes; no dyes or other substances precipitated.

Example 7

To 20 parts of an aromatic hydrocarbon (xylene), 5 parts of the monoazo compound of the present invention obtained in Example 5 was added, followed by uniform mixing and dissolution at 40° C. to yield a 25% dense solution.

In the same manner as in Example 6, the dense solution was tested for storage stability. No dyes or other substances precipitated.

Example of coloring petroleum solvent

Example 8

Each of the dense solutions of the present invention obtained in Examples 6 and 7 was diluted with n-hexane to a final concentration of 20 ppm (0.002%).

The solution colored by each of the dyes of Example Compounds 1 through 3 had a yellow color, the solution colored with the dye of Example Compound 4 had an orange color, and the solution colored by the dye of Example Compound 5 had a red color.

Also, to 200 cc of each colored solution (20 ppm concentration), 1 g of silica gel was added, and this solution was shaken and then kept standing, after which the supernatant liquid was observed and was not discolored completely.

Comparative examples of preparation of solutions and coloring

Solutions of Comparative Compounds (dyes) (a), (d), (e), (k) and (o) were prepared in the same manner as in Example 7. The coloring agent for the most part remained undissolved, indicating significantly lower solubility in comparison with Example Compound 5.

The obtained solutions were diluted with n-hexane in the same manner as in Example 8 to yield 20 ppm colored solutions, all of which were found to be easy to discolor with silica gel. It is clear from the above that the monoazo liquid dye according to the present invention is capable of forming dense colored solutions with hydrocarbons solvents and is resistance even at a concentration of only 10 or 20 ppm to discoloring of hydrocarbon solvent solutions thereof by discoloring agents including silica gel. Thus, the present invention contemplates dilute colored solutions of a concentration of only about 10 or 20 ppm of the instant monoazo liquid dye in a hydrocarbon solvent.

What is claimed is:

1. Monoazo liquid dye of the formula I:

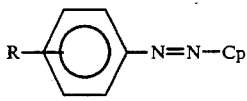 [I]

wherein R represents sec-butyl and Cp represents a coupling compound residue selected from the group consisting of the coupling component residues represented by the formulas (a), (b) and (c):

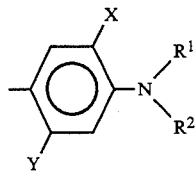 (a)

wherein $R^1$ and $R^2$ independently represent a linear or branched alkyl group, and X and Y individually represent hydrogen, an alkyl group having 1 or 2 carbon atoms or an alkoxy group having 1 or 2 carbon atoms, except that X and Y cannot both be hydrogen,

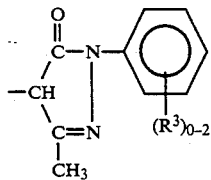 (b)

wherein $(R^3)_{0-2}$ means zero to two substituents $R^3$, each $R^3$ independently representing an alkyl group having 1 or 2 carbon atoms, an alkoxy group having 1 or 2 carbon atoms or a halogen atom, and

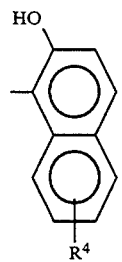 (c)

wherein $R^4$ represents hydrogen, an alkyl group having 1 to 4 carbon atoms, an alkoxy group having 1 or 2 carbon atoms or a halogen atom, the monoazo liquid dye being capable of forming dense colored solutions with hydrocarbon solvents and being resistant at a concentration of 10 to 20 ppm to decoloring of hydrocarbon solvent solutions thereof by silica gel.

2. Dye of claim 1 wherein R is located at the ortho position.

3. Dye of claim 1 wherein R is located at the meta position.

4. Dye of claim 1 wherein R is located at the para position.

5. Dense solution of at least one kind of the monoazo liquid dye of claim 1 in a hydrocarbon solvent wherein the concentration of the monoazo liquid dye is 20 to 80% by weight.

6. Dense solution of claim 5 wherein the concentration of the monoazo liquid dye is 25 to 50% by weight.

7. Dense solution of at least one kind of the monoazo liquid dye of claim 6 in a hydrocarbon solvent wherein the concentration of the monoazo liquid dye is 20 to 80% by weight.

8. Dense solution of at least one kind of the monoazo liquid dye of claim 3 in a hydrocarbon solvent wherein the concentration of the monoazo liquid dye is 20 to 80% by weight.

9. Dense solution of at least one kind of the monoazo liquid dye of claim 4 in a hydrocarbon solvent wherein the concentration of the monoazo liquid dye 20 to 8% by weight.

10. Dense solution of at least two kinds of the monoazo liquid dye of claim 1 selected from those having R at the ortho, meta and para positions, respectively, in a hydrocarbon solvent wherein the concentration of the monoazo liquid dye is 20 to 80% by weight.

11. Dilute colored solution of a concentration of about 10 or 20 ppm of a monoazo liquid dye of claim 1 in a hydrocarbon solvent.

* * * * *